US008146088B2

(12) United States Patent
Inoue (10) Patent No.: US 8,146,088 B2
(45) Date of Patent: Mar. 27, 2012

(54) COMMUNICATION APPARATUS AND METHOD FOR CONTROLLING COMMUNICATION APPARATUS

(75) Inventor: Yutaka Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 12/202,993

(22) Filed: Sep. 2, 2008

(65) Prior Publication Data
US 2009/0064170 A1   Mar. 5, 2009

(30) Foreign Application Priority Data

Sep. 4, 2007 (JP) ................................. 2007-229451

(51) Int. Cl.
 *H04L 12/00* (2006.01)
 *G06F 3/00* (2006.01)
(52) U.S. Cl. ........................................ 718/102; 718/105
(58) Field of Classification Search .................. None
See application file for complete search history.

(56) References Cited

U.S. PATENT DOCUMENTS

| | | | | |
|---|---|---|---|---|
| 3,958,088 A * | 5/1976 | Vieri | ..................... | 379/100.13 |
| 4,870,678 A * | 9/1989 | Adachi | ..................... | 379/100.06 |
| 4,967,288 A * | 10/1990 | Mizutori et al. | ............... | 358/425 |
| 6,025,931 A * | 2/2000 | Bloomfield | ................... | 358/402 |
| 6,724,880 B1 * | 4/2004 | Lynch | ........................... | 379/219 |
| 6,970,905 B2 * | 11/2005 | Jeffery et al. | ................. | 709/203 |
| 7,110,134 B2 * | 9/2006 | Iimoto et al. | ................. | 358/1.15 |
| 7,246,270 B2 * | 7/2007 | Nagano et al. | ................. | 714/43 |
| 7,375,839 B2 * | 5/2008 | Yoshida | ....................... | 358/1.15 |
| 7,609,707 B2 * | 10/2009 | Pike et al. | ...................... | 370/412 |
| 7,996,844 B2 * | 8/2011 | Ogata et al. | ................... | 718/104 |
| 2005/0002050 A1 * | 1/2005 | Yamamoto | ................... | 358/1.13 |

FOREIGN PATENT DOCUMENTS

JP    2004-48159 A    2/2004

* cited by examiner

*Primary Examiner* — Eric Coleman
(74) *Attorney, Agent, or Firm* — Canon U.S.A., Inc. IP Division (57) ABSTRACT

A communication apparatus includes a control unit including a controller configured to control the communication apparatus, a first communication unit configured to perform communication under control of the controller, and a second communication unit including a subcontrol unit and configured to perform communication under control of the subcontrol unit, wherein a load condition of the controller is determined, and one of the first communication unit and the second communication unit is selected to perform communication processing based on the determined load condition.

15 Claims, 6 Drawing Sheets

LOAD CRITERION TABLE

| ① CONTENDING OPERATION SYSTEM |
| --- |
| · THE NUMBER OF JOBS INCLUDING WAITING JOB IS LARGE |
| · THE NUMBER OF JOBS OTHER THAN FACSIMILE JOB IS LARGE |
| ② RESOURCE MANAGEMENT SYSTEM |
| · REMAINING MEMORY CAPACITY IS SMALL |
| · DEVICE RESOURCE (IMAGE PROCESSING DEVICE) IS BEING USED |
| ③ USER SETTING SYSTEM |
| · FAX RESOLUTION IS HIGH |
| · MULTI-ADDRESS TRANSMISSION IS INSTRUCTED |

COMMUNICATION APPARATUS AND METHOD FOR CONTROLLING COMMUNICATION APPARATUS

BACKGROUND OF THE INVENTION

1. Field of the Invention

The present invention relates to a communication apparatus connected to a plurality of lines capable of transmitting/receiving data via the plurality of lines, and a method for controlling the communication apparatus.

2. Description of the Related Art

Multifunction peripherals having functions of copying, printing, scanning, and a facsimile have been widely used. Recently, multifunction peripherals having a much wider variety of functions with reduced footprints and lower power consumption have been proposed.

Many conventional multifunction peripherals include a facsimile function that supports only two lines. Recent demand has been for a facsimile function that can accommodate more then two lines.

The demand has arisen because a multifunction peripheral having a connection with a plurality of lines allows an integration of devices with a reduced footprint. In addition, efficient multi-address transmission can be performed using a plurality of lines. The multi-address transmission refers to transmission of any data to a plurality of addresses.

Accordingly, if one peripheral accommodates a plurality of lines, data can be simultaneously transmitted to a plurality of addresses via the plurality of lines. Thus, transmission efficiency can be increased and the multi-address transmission can be performed in a shorter time. To satisfy such a demand for a multifunction peripheral that can accommodate multi-lines, a multifunction peripheral having a larger number of communication channels has been proposed.

However, when data is transmitted via a plurality of lines at the same time, a load on a control unit (main controller) for controlling devices increases and software processing cannot respond to the increase, resulting in, among other things, interruption of communication. Japanese Patent Application Laid-Open No. 2004-48159 addresses this by implementing a technique for distributing the load on the control unit via a software program.

According to this technique, a special controller (sub controller) for a facsimile (communication) unit is provided in addition to a controller (main controller) of a multifunction peripheral, and the sub controller executes communication processing. Such load distribution processing enables increase of a number of lines and real-time communication processing.

SUMMARY OF THE INVENTION

The present invention is directed to a technique for automatically selecting a communication unit suitable for communication based on a load on a main controller to realize load distribution.

According to an aspect of the present invention, a communication apparatus includes a control unit including a controller configured to control the communication apparatus, a first communication unit configured to perform communication under control of the controller, a second communication unit including a subcontrol unit and configured to perform communication under control of the subcontrol unit, a condition determination unit configured to determine a load condition of the controller, and a selection unit configured to select one of the first communication unit and the second communication unit to perform communication processing based on a load condition determined by the condition determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
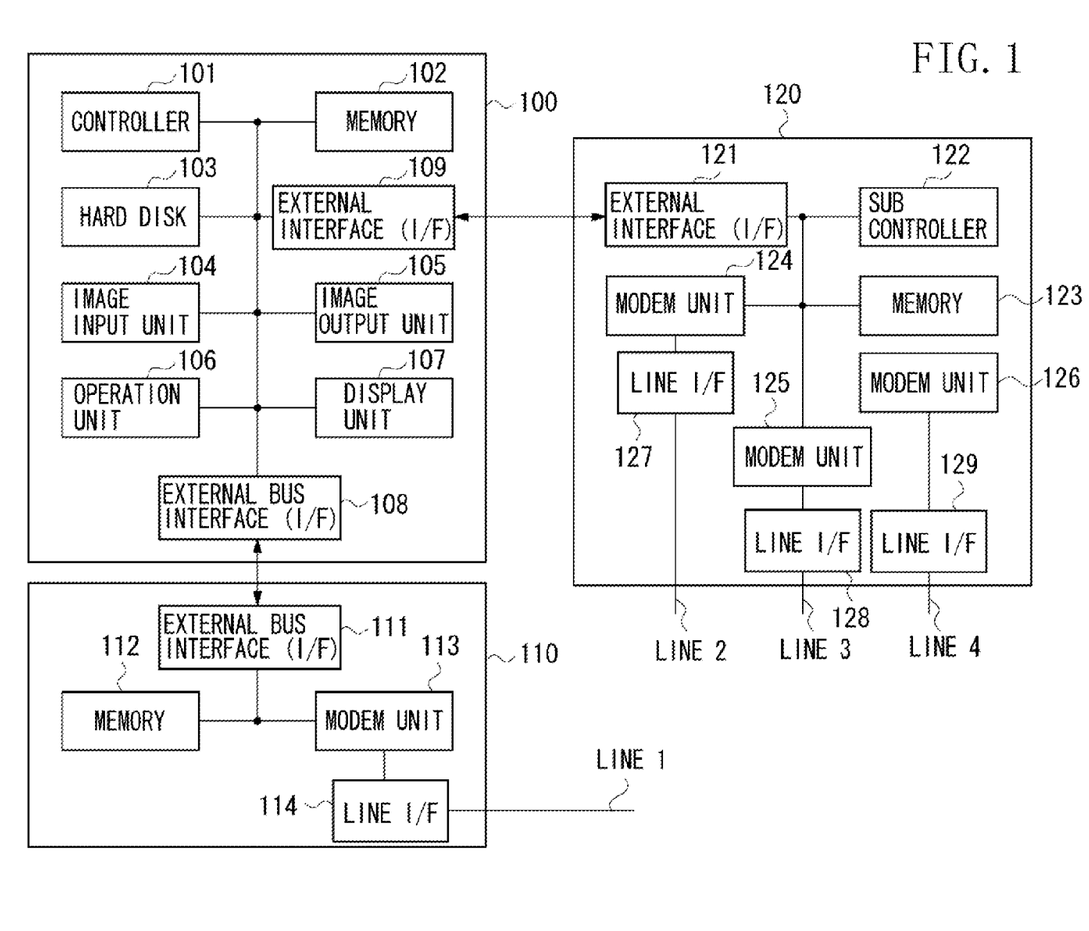
FIG. 1 is a block diagram illustrating a configuration of a multifunction peripheral according to an exemplary embodiment of the present invention.

FIG. 1 is a block diagram illustrating a configuration of a multifunction peripheral according to a first exemplary embodiment of the present invention.

Hereinbelow, the present invention is described using the multifunction peripheral as an example. However, the present invention is not limited to the multifunction peripheral, but is applicable to communication apparatuses such as a personal computer (PC), a mobile communication device, or a facsimile machine, etc.

A main controller board (main control unit) 100 can execute copying, printing, scanning (original scanning), and other such operations. An on-board communication board (first communication unit) 110 is connected to the main controller board 100 via an interface such as a bus, and the main controller board 100 controls communication processing thereof.

A subsystem communication board (second communication unit) 120 is connected to the main controller board 100 via a general-purpose interface, such as a serial interface or a parallel interface. The subsystem communication board 120 includes a unique controller (sub controller) 122, and the sub controller 122 controls communication processing and other such processing of the subsystem communication board 120.

The on-board communication board 110 is connected to a line 1 via line interface 114. The subsystem communication board 120 is connected to lines 2 to 4 via line interfaces 127, 128, and 129 respectively. As described above, the multifunction peripheral of the present exemplary embodiment accommodates four communication lines in total. However, the present invention is not limited to four lines.

The configuration of the main controller board 100 will now be described. A controller 101 controls operation of the multifunction peripheral and includes, for example, a central processing unit (CPU) incorporated into the main controller board 100. A memory 102 stores programs executed by the controller 101 and various kinds of data regarding a processing target.

A hard disk (HDD) 103 is a large-capacity storage device storing various kinds of data and programs. An image input unit 104 includes, for example, a scanner configured to scan and read an image of an original etc. An image output unit 105 includes a printer unit configured to print an image on a recording sheet according to image data.

An operation unit 106 is operated by an operator to input various instructions for copying, facsimile transmission, and other operations. A display unit 107 displays an operation state of the multifunction peripheral, a message for an operator, an error message, etc.

An external bus interface 108 controls an interface between the main controller board 100 and the on-board communication board 110. An external interface 109 controls an interface between the main controller board 100 and the subsystem communication board 120. The on-board communication board 110 and the subsystem communication board 120 are both configured on a board which is detachably attached to the multifunction peripheral's main body.

The configuration of the on-board communication board 110 will now be described. An external bus interface 111 is connected to the main controller board 100. A memory 112 temporarily stores communication data transmitted/received to/from the main controller board 100.

A modem unit 113 converts digital data, such as image data, stored in the memory 112 into communication line data (analog data for G3 facsimile) as well as converts data received via the line 1 into digital data. Line interface 114 is a line control unit, such as a network control unit (NCU), that controls an interface between the modem unit 113 and the line 1.

The configuration of the subsystem communication board 120 will now be described. An external interface 121 controls communications between the subsystem communication board 120 and the main controller board 100. A subcontroller 122 is, for example, a CPU controlling the subsystem communication board 120. A memory 123 stores programs executed by the subcontroller 122 and data.

A modem unit 124 converts digital data, such as image data, stored in the memory 123 into communication line data as well as converts data received via a line 2 into digital data. A modem unit 125 converts digital data, such as image data, stored in the memory 123 into communication line data as well as converts data received via a line 3 into digital data. A modem unit 126 converts digital data, such as image data, stored in the memory 123 into communication line data as well as converts data received via a line 4 into digital data.

Line interfaces 127, 128, and 129 are line control units, such as an NCU, configured to respectively control an interface between corresponding modem units 124, 125, and 126 and a corresponding lines 2, 3, and 4. The above modem units 113, 124 to 126 are each referred also to as a "modem".

Operations of the multifunction peripheral having the above described configuration are described below. First, transmission processing with the on-board communication board 110 is described. An operator sets a target original on the image input unit 104 and starts the transmission processing by designating a destination on the operation unit 106, and entering an instruction for image input.

Then, the controller 101 temporarily stores image data scanned by the image input unit 104 onto the hard disk 103. After that, the controller 101 instructs the on-board communication board 110 to dial a number designated by the operation unit 106 and connect thereto via the external bus interfaces 108 and 111.

After confirming that the connection has been established, the controller 101 reads target image data from the hard disk 103 and transmits the image data to the memory 112 of the on-board communication board 110 via the external bus interfaces 108 and 111. Then, the controller 101 controls the modem unit 113 to modulate the image data on the memory 112 and transmits the resultant data to the line 1 via the line interface 114.

Next, reception processing by the on-board communication board 110 is described. When an incoming call on the line 1 is detected, the on-board communication board 110 notifies the controller 101 of the incoming call via the external bus interfaces 108 and 111.

In response to the notification, the controller 101 instructs the on-board communication board 110 to receive the incoming call, and then demodulates data received via the line interface 114 by the modem unit 113. The demodulated data is stored in the memory 112. Then, the controller 101 receives data stored in the memory 112 via the external bus interfaces 108 and 111 and stores the data in the hard disk 103.

After completion of the reception processing, the controller 101 causes the image output unit 105 to print the image data stored in the hard disk 103 onto a recording medium. In this way, the controller 101 of the main controller board 100 controls the data transmission/reception processing by the on-board communication board 110.

Next, transmission processing by the subsystem communication board 120 is described. An operator sets a target original on the image input unit 104 and starts the transmission processing by designating a destination on the operation unit 106, and entering an instruction for image input.

Then, the controller 101 temporarily stores image data scanned by the image input unit 104 onto the hard disk 103. After that, the controller 101 instructs the subsystem communication board 120 to dial a number designated by the operation unit 106 and connect thereto via the external interfaces 109 and 121.

After confirming that the connection has been established, the controller 101 reads target image data from the hard disk 103, rasterizes the image data, and stores the rasterized image data on the memory 123 of the subsystem communication board 120 via the external interfaces 109 and 121. Then, in order to transmit the data via any one of the line interfaces 127 to 129, the subcontroller 122 of the subsystem communication board 120 controls one of the corresponding modem units 124 to 126 to demodulate image data stored in the memory 123.

After that, the controller 101 transmits the data to the line (any one of the lines 2 to 4) via the line interface (any one of the line interfaces 127 to 129) corresponding to one of the modem units 124 to 126, which executes the demodulation.

In this transmission operation, image data is stored in the memory 123 in units of at least one page. When facsimile communication is started, information about capacities of a destination device (sheet size for a received image, image resolution, etc.) is obtained by negotiation for initialization. Then, the controller 101 changes magnification and resolution of data in the memory 123 according to the capacities of the destination device. After that, the controller 101 sends the resultant image data to the destination device.

In the above transmission processing by the on-board communication board 110, the controller 101 performs magnification change and resolution conversion processing as described above. In contrast, in the communication processing with the subsystem communication board 120, the subcontroller 122 of the subsystem communication board 120 shares a part of the processing of the controller 101.

Thus, a processing load is distributed to ensure multichannel facsimile transmission operations. Moreover, in the subsystem communication board 120, the subcontroller 122 controls communications. Accordingly, the processing load on the controller 101 can be reduced in terms of communication control as well, and function distribution is realized.

Next, reception processing by the subsystem communication board 120 is described. When an incoming call on the line 2, 3, or 4 is detected, the subsystem communication board 120 notifies the controller 101 of the incoming call via the external interfaces 109 and 121.

In response to the notification, the controller 101 instructs the subsystem communication board 120 to receive the incoming call, and then, controls one of the corresponding modem units 124 to 126 to receive data via a corresponding line interface (any one of the line interfaces 127 to 129). Then, the controller 101 temporarily stores the demodulated data in the memory 123, and receives data stored in the memory 123 via the external interfaces 109 and 121.

The controller 101 stores the received data in the hard disk 103. After the completion of the communication, the controller 101 causes the image output unit 105 to print the image data stored in the hard disk 103 onto a recording medium.

As described above, the multifunction peripheral of the present exemplary embodiment is provided with the on-board communication board 110 and the detachable subsystem communication board 120. Accordingly, the multifunction peripheral can be provided at low costs to a user who requires only one line (line 1).

Further, a software processing load can be optimized by distributing the processing load for a user who requires two or more lines (lines 2 to 4). As a result, an optimum multifunction peripheral can be realized in which the cost and functions balance with each other.

Next, a line selection operation at the time of data transmission of the multifunction peripheral according to the present exemplary embodiment is described. The multifunction peripheral of the present exemplary embodiment is provided with the on-board communication board 110 and the subsystem communication board 120. The processing load of the main controller board 100 varies depending on which board is used.

More specifically, when the on-board communication board 110 is used, the main controller board 100 executes image processing such as magnification change and resolution conversion processing. Therefore, the load on the controller 101 is high.

In contrast, the subsystem communication board 120 is used to increase the number of lines available for communications. Thus, the subsystem communication board 120 can perform image processing functions such as the magnification change and the resolution conversion in place of the controller 101. Further, since the subsystem communication board 120 can execute communication control, the processing load of the controller 101 can be reduced.

The present embodiment is directed to distribute the load of the entire multifunction peripheral by selecting a communication line according to a load condition of the controller 101 during data transmission.

For example, if it is determined that the load of the controller 101 is high, as in a case where facsimile communication and copying or other such processing contend with each other, the facsimile communication is performed by the subsystem communication board 120 that can reduce the processing load of the controller 101. Accordingly, the multifunction peripheral that optimally distributes processing load can be realized.

Figure 2:
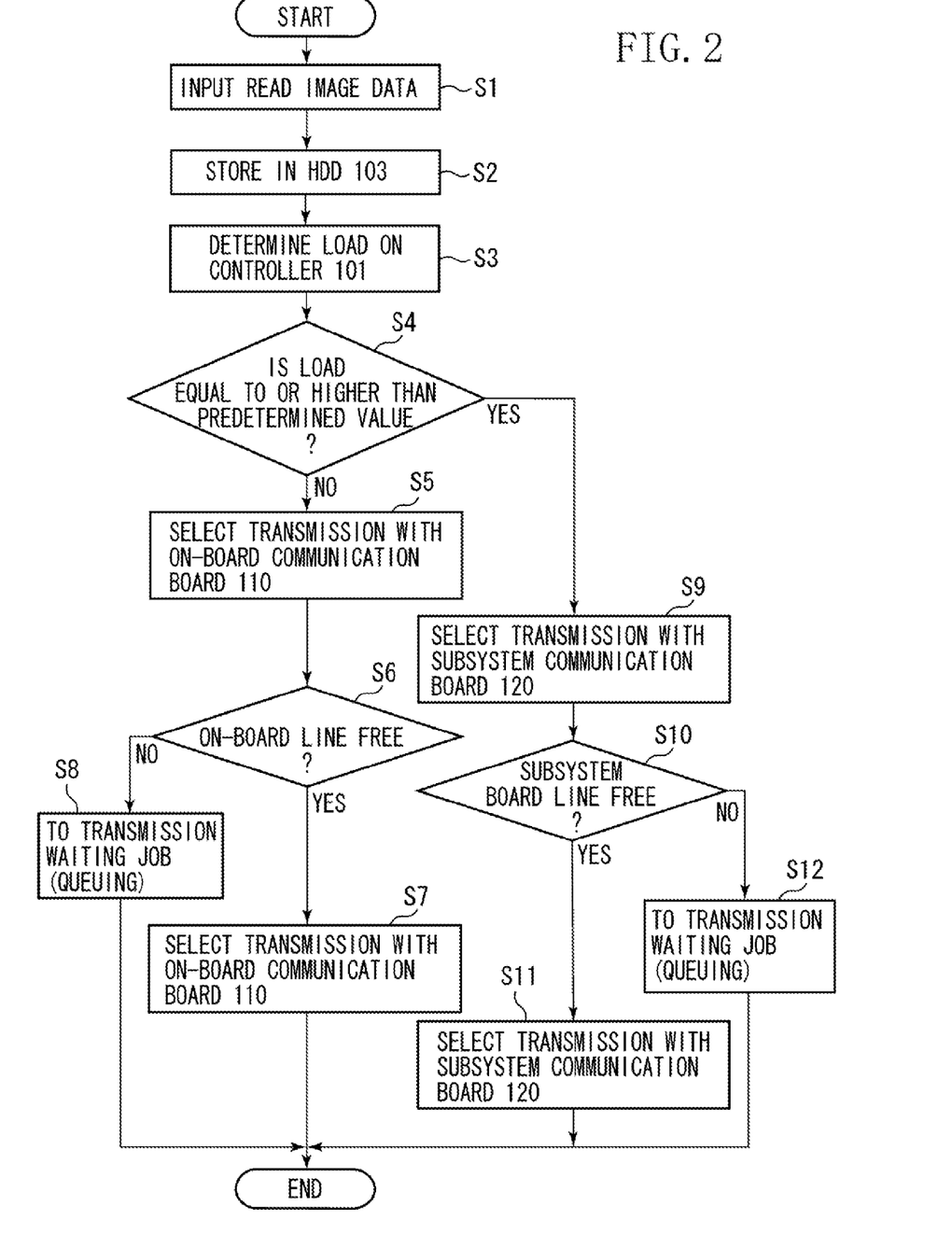
FIG. 2 is a flowchart illustrating facsimile transmission processing of a multifunction peripheral according to a first exemplary embodiment of the present invention.

FIG. 2 is a flowchart illustrating facsimile transmission processing of the multifunction peripheral of the present embodiment. Programs for executing the facsimile transmission processing are stored in the memory 102 during execution and executed under the control of the controller 101.

An operator sets a target original on the image input unit 104 and starts the transmission processing by designating a destination on the operation unit 106, and entering an instruction for image input (pressing a "transmission start" (or "start") button).

In step S1, the controller 101 instructs the image input unit 104 to read the original and inputs image data of the original read by the image input unit 104. In step S2, the controller 101 stores the read image data on the HDD 103. Next, the processing advances to step S3 to determine a load condition of the controller 101 (load condition determination) in the processing. The load condition determination processing is described below with reference to FIG. 3.

Next, the processing advances to step S4. In step S4, the controller 101 determines whether the processing load is greater than or equal to a predetermined value. If the processing load of the controller 101 is greater than or equal to the predetermined value or more (YES in step S4), the processing advances to step S9. In step S9, the controller 101 selects the subsystem communication board 120 as a communication board for the facsimile transmission.

Next, the processing advances to step S10, and the controller 101 determines whether the lines connected to the subsystem communication board 120 (line 2, 3, or 4) are free. If all of the lines are in use (NO in step S9), the processing advances to step S12. In step S12, the controller 101 registers a target transmission job as a waiting job (JOB Queuing) and terminates the processing. The waiting job is re-input when the controller 101 becomes capable of performing the job, and step S3 and subsequent steps of the flowchart are automatically repeated.

On the other hand, if it is determined that any line is free in step S10 (YES in step S10), the processing advances to step S11. In step S11, the controller starts the facsimile transmission from the subsystem communication board 120 via the free line (any one of the lines 2 to 4) to execute the facsimile transmission.

In step S4, if the load of the controller 101 is less than the predetermined value (NO in step S4), the processing advances to step S5. In step S5, the controller 101 selects the on-board communication board 110 as a communication medium for the facsimile transmission. Next, the processing advances to step S6, and the controller 101 determines whether the line connected to the on-board communication board 110 (the line 1) is free.

In step S6, if it is determined that the line 1 is being used (NO in step S6), the processing advances to step S8. In step S8, the controller 101 registers the target transmission job as the waiting job (JOB Queuing) and terminates the processing. The waiting job is re-input when the controller 101 becomes capable of performing the job, and step S3 and subsequent steps are automatically repeated. Further, if it is determined that the line 1 is free in step S6 (YES in step S6), the processing advances to step S7, and the controller 101 starts the facsimile transmission using the line 1 via the on-board communication board 110.

As described above, according to the present exemplary embodiment, when performing the facsimile transmission, the load condition of the controller 101 in the processing is determined. Then, when the load is greater than or equal to the predetermined value, the subsystem communication board 120 that can reduce the load of the controller 101 is used.

In contrast, when the load of the controller 101 is less than the predetermined value, the on-board communication board 110 is selected for the facsimile transmission. In this way, the load can be optimally distributed according to the load condition of the controller 101 on the main controller board 100 to execute transmission/reception control.

Figure 3:
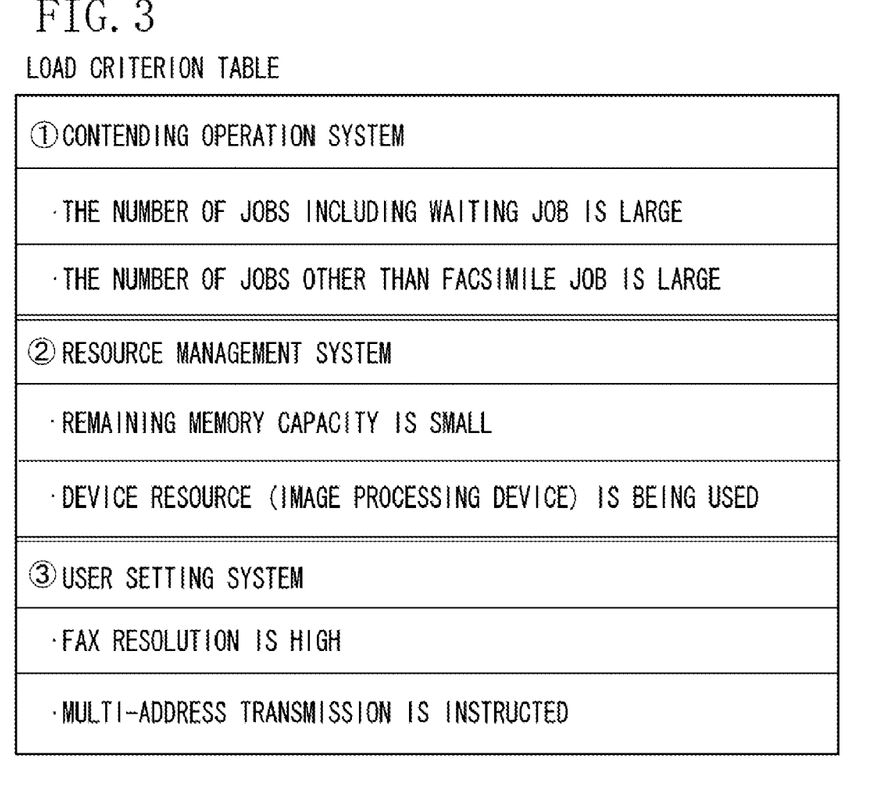
FIG. 3 illustrates criteria for determining a load condition of a main controller board according to the first exemplary embodiment.

FIG. 3 illustrates criteria for determining the load condition of the controller 101 on the main controller board 100 of the present exemplary embodiment. In FIG. 3, the following three broad criteria are illustrated:

(1) Contending Operation System

This criterion is to determine whether a plurality of processing is executed at the same time (for example, copying and the facsimile transmission are concurrently performed), whether the waiting (queued) job is detected, and whether a number of queued jobs is large.

(2) Resource Management System

This criterion is based on an operational state of a memory and various devices. When a free area of the memory 102 is small, the image input unit 104 and the image output unit 105 are executing any processing, or a program for image processing is being executed, the load is determined to be high.

(3) User Setting System

This criterion is based on a transmission condition set by a user. For example, when high resolution is set for the facsimile transmission or multi-address transmission is instructed, a communication load is determined to be high.

The three criteria are described in more detail below:
(1) Contending Operation System A number of jobs including the waiting job (queued job) is a prescribed value or more.
The number of jobs other than a facsimile job (job other than communication) is large.

The number of current jobs is counted and when the above conditions apply to the counted value, the load of the controller 101 is determined to be high.

(2) Resource Management System

A remaining capacity of a memory is small.
A current remaining memory capacity is detected and when the remaining memory capacity is a less than or equal to a prescribed value, the load of the controller 101 is determined to be high.

Device resources are not free.
For example, it is determined whether device resources of devices that perform image processing such as magnification and rotation are free. If no resource is free, the load of the controller 101 is determined to be high.

(3) User Setting System

High resolution is set for the facsimile transmission.
When it is instructed to transmit a high-resolution facsimile image (for example, ultrafine (400×400 dpi)), a load of image processing etc. becomes high. Thus, the load of the controller 101 is determined to be high.

Facsimile multi-address transmission is instructed.
When the multi-address transmission (transmission to a plurality of destinations) is instructed, image processing should be repeated as many times as a number of destinations. Thus, the load of the controller 101 is determined to be high.

If at least one of the above described conditions is satisfied, the load of the controller 101 is determined to be high, and the facsimile transmission is performed using the subsystem communication board 120.

The load condition determination processing based on the above criteria (1) to (3) is performed in step S4 illustrated in FIG. 2. The processing executed in step S4 illustrated in FIG. 2 based on each criterion, is described below.

Figure 4:
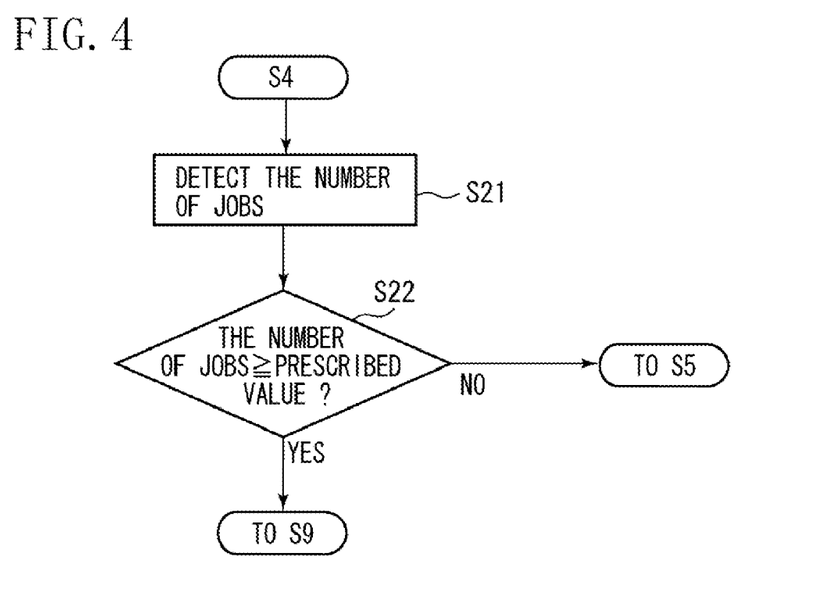
FIG. 4 is a flowchart illustrating determination processing in a contending operation system (criterion 1) illustrated in FIG. 3.

FIG. 4 is a flowchart illustrating determination processing based on the contending operation system (criterion 1) illustrated in FIG. 3. First, in step S21, the controller 101 counts the number of the waiting jobs. In step S22, the controller 101 determines whether the counted number of jobs is greater than or equal to the prescribed value.

The number of waiting jobs can be determined based on a waiting line referred to as job tables and queues. If the number of jobs detected in step S21 is the prescribed value or more (YES in step S22), the controller 101 determines that the load of the controller 101 is high and advances to step S9 (FIG. 2).

On the other hand, if the number of jobs is less than a prescribed value in step S22 (NO in step S22), the controller 101 determines that the load of the controller 101 is low and advances to step S5 (FIG. 2).

Figure 5:
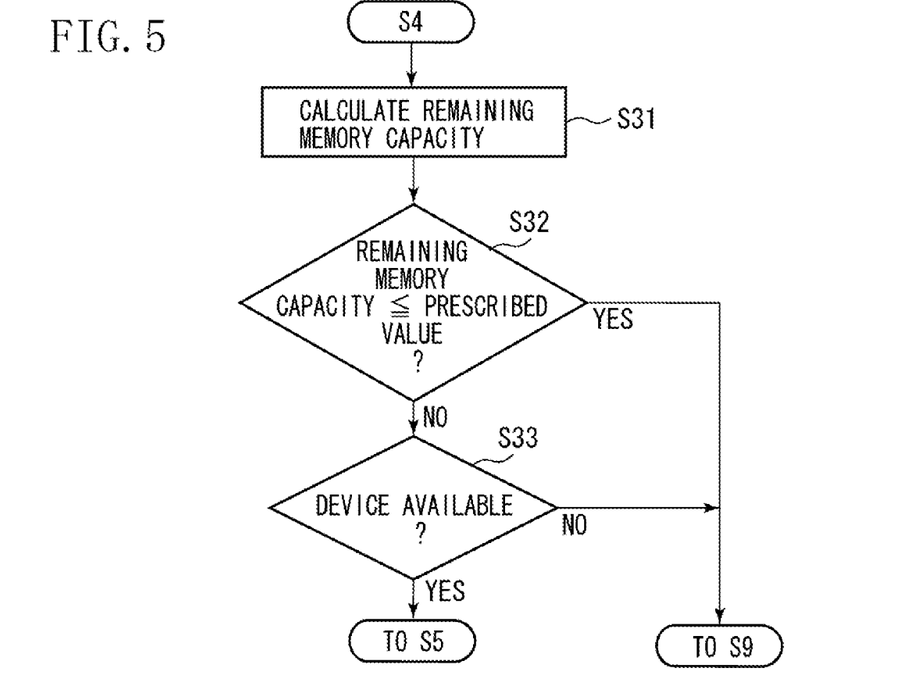
FIG. 5 is a flowchart illustrating determination processing in a resource management system (criterion 2) illustrated in FIG. 3.

FIG. 5 is a flowchart illustrating determination processing based on the resource management system (criterion 2) illustrated in FIG. 3. First, in step S31, the controller 101 calculates a free memory capacity in the memory 102. Next, in step S32, the controller 11 determines whether the calculated free memory capacity is less than or equal to a prescribed value.

By calculating the free memory capacity, a remaining capacity of a memory that is managed by main software of an operating system (OS) can be checked. Alternatively, in a case where a memory management table is used, the free memory capacity can be calculated based on the management table.

In step S32, if it is determined that the free memory capacity is less than or equal to the prescribed value (YES in step S32), the controller determines that the load of the controller 101 is high and advances to step S9. On the other hand, if the free memory capacity is greater than the prescribed value in step S32 (NO in step S32), the controller 101 advances to step S33 and checks usage of a target device (for example, hardware or a task for image processing such as magnification and rotation of images).

In general software processing, a device can be controlled with a plurality of software tasks, and exclusive control called "semaphore" is executed to prevent simultaneous sharing of the device among the tasks. That is, when a task uses a device, the task declares semaphore and prohibits the other tasks from using the device until the semaphore is withdrawn.

Accordingly, for example, in step S33, the controller 101 can determine whether the target device is available by monitoring the semaphore. In this way, if the device is being used in step S33 (NO in step S33), the controller 101 determines that the load of the controller 101 is high and advances to step S9. On the other hand, if the device is available in step S33

(YES in step S33), the controller 101 determines that the load of the controller 101 is low and advances to step S5.

Figure 6:
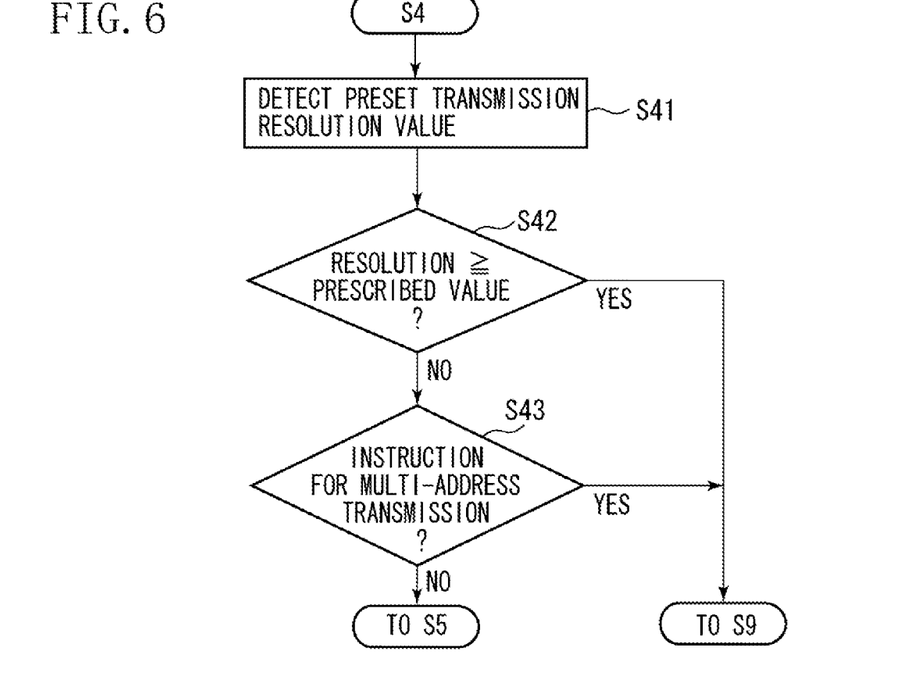
FIG. 6 is a flowchart illustrating determination processing in a user setting system (criterion 3) illustrated in FIG. 3.

FIG. 6 is a flowchart illustrating determination processing based on the user setting system (criterion 3) illustrated in FIG. 3. First, in step S41, the controller 101 detects a resolution set for the facsimile transmission. Next, the controller advances to step S42 and determines whether the resolution is greater than or equal to a prescribed value.

In step S42, if it is determined that the resolution is greater than or equal to the prescribed value (YES in step S42), the controller 101 determines that the load of the controller 101 is high and advances to step S9. On the other hand, if the resolution is less than the prescribed value in step S42 (NO in step S42), the controller 101 advances to step S43 and determines whether the multi-address transmission is instructed.

In step S43, if the multi-address transmission is instructed (YES in step S43), the controller 101 determines that the load of the controller 101 is high and advances to step S9. On the other hand, in step S43, if the multi-address transmission is not instructed (NO in step S43), the controller 101 determines that the load of the controller 101 is low and advances to step S5.

Figure 7:
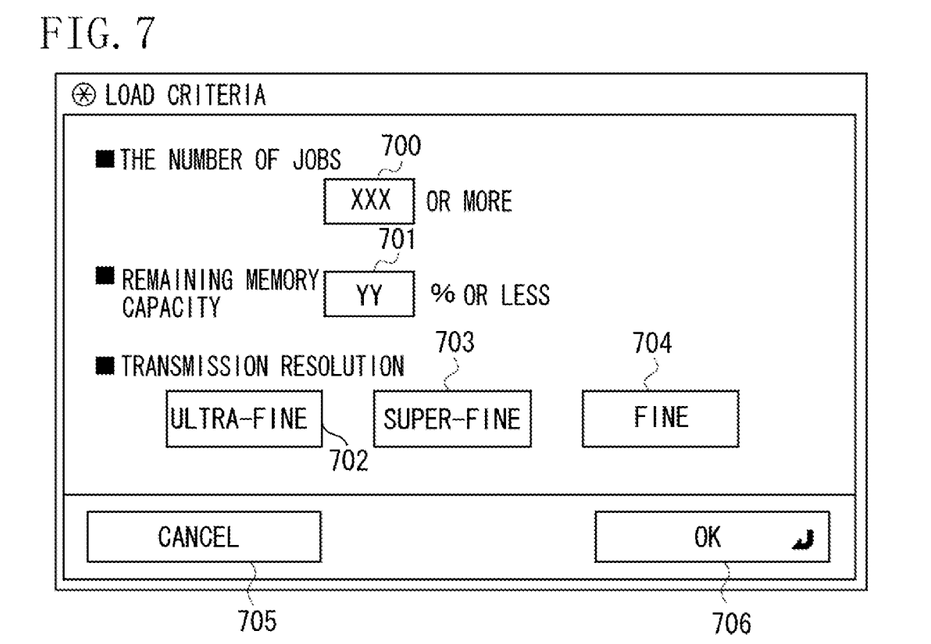
FIG. 7 illustrates an example of a setting screen for inputting prescribed values of various criteria illustrated in FIG. 3.

Next, a case where a user can set the above conditions is described. FIG. 7 illustrates an example of a setting screen for inputting prescribed values of various criteria illustrated in FIG. 3. This screen is displayed on the display unit 107 and can be set using operation buttons of the operation unit 106 or an operation screen.

In FIG. 7, an entry field 700 is used to input the prescribed value of the number of jobs which serves as the criterion (1) illustrated in FIG. 3. An entry field 701 is used to input the prescribed value of the criterion for a free memory capacity. In the present example, the free capacity can be input in percentage (%).

A resolution for the facsimile transmission can be selected from any one of ultrafine 702, superfine 703, and fine 704 as the prescribed value. Accordingly, if the ultrafine 702 is selected, for example, only when "ultrafine" resolution is set for the facsimile transmission, the controller 101 determines that the load of the controller 101 is high. If the resolution is "superfine" or "fine", the controller 101 determines that the load of the controller 101 is low.

A cancel button 705 is used to cancel the setting. An OK button 706 is used to confirm the setting. As described above, a user can set prescribed values for various conditions and thus, can freely change criteria for determining the load condition and load distribution can be executed with a higher degree of freedom.

In FIG. 7, three types of prescribed values are set in one screen, but the present invention is not limited thereto. Any other screen configuration can be employed. For example, each of the prescribed values may be set respectively in different screens.

Second Exemplary Embodiment

In the above first exemplary embodiment, the load of the controller 101 is detected to automatically select a line. According to a second exemplary embodiment, a user can select a line selection method in advance. The hardware configuration of a multifunction peripheral of the second exemplary embodiment is similar to that of the first exemplary embodiment and thus its description is omitted herein.

An existing multifunction peripheral has a mechanism for manually selecting a communication line in designating a destination of the facsimile transmission. However, in a case of automatically selecting a line based on the load of the controller 101, even if a user designates a line, another line might be used.

According to the second exemplary embodiment, an additional mode (designated-line-prioritized mode) is set. In this mode, the line designated by a user is prioritized to not automatically select the line according to the load condition of the controller 101. As a result, a user can set one of the designated-line-prioritized mode and a mode (automatic-line-selection-prioritized mode) in which the line selected according to the load condition of the controller 101 is prioritized, as in the first exemplary embodiment.

Figure 8:
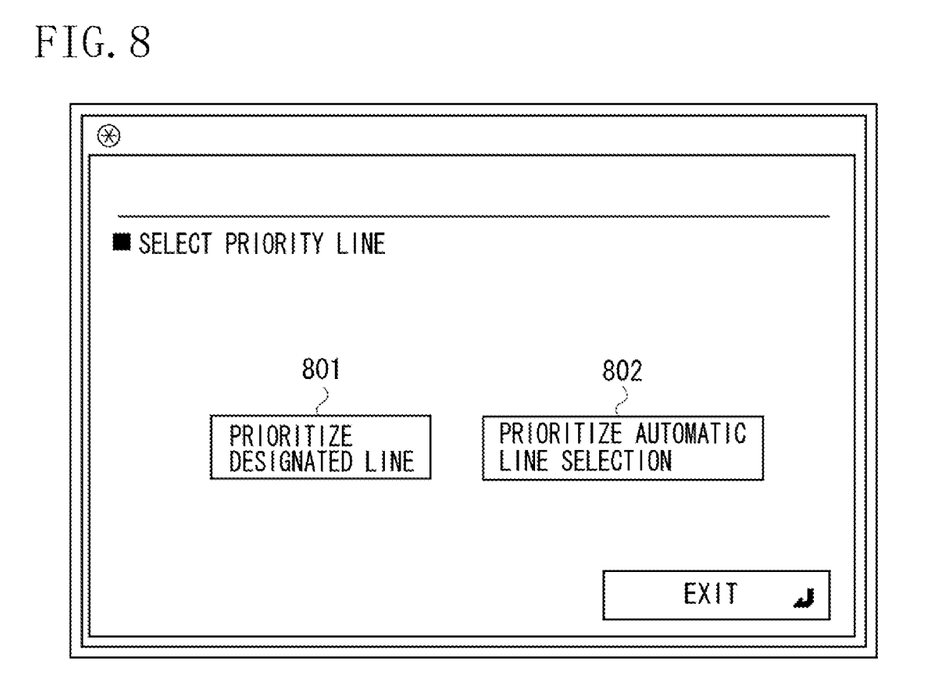
FIG. 8 illustrates a user setting screen example according to a second exemplary embodiment of the present invention.

FIG. 8 illustrates an example user setting screen according to the second exemplary embodiment. This screen is displayed on the display unit 107 and can be set using operation buttons of the operation unit 106 or an operation screen. In this example, a user can select "prioritize designated line" 801 or "prioritize automatic line selection" 802.

If the "prioritize designated line" 801 is selected, the line is not automatically selected according to the load condition of the controller 101, and the line designated by a user is preferentially used to perform the facsimile transmission (this function is similar to a function of a conventional communication apparatus).

On the other hand, if the "prioritize automatic line selection" 802 is selected, as described in the first exemplary embodiment, a transmission line is automatically selected according to the load condition of the controller 101. Thus, a user can designate a desired line and prevent the facsimile transmission via an unexpected line. For example, in a case of managing a plurality of lines on a division basis and also managing communication fees on the division basis, the "prioritize designated line" 801 is selected to enable efficient management with no confusion.

In the above example, the user setting screen for setting priorities of lines for the facsimile transmission is displayed to allow a user to select a desired line. However, the present invention is not limited thereto. For example, options like "line 1", "line 2", "line 3", "line 4", and "auto" may be displayed in designating a line and selected as follows. Only when "auto" is selected, the processing of the above first exemplary embodiment is performed. If any specific line is designated, the designated line is preferentially used.

Figure 9:
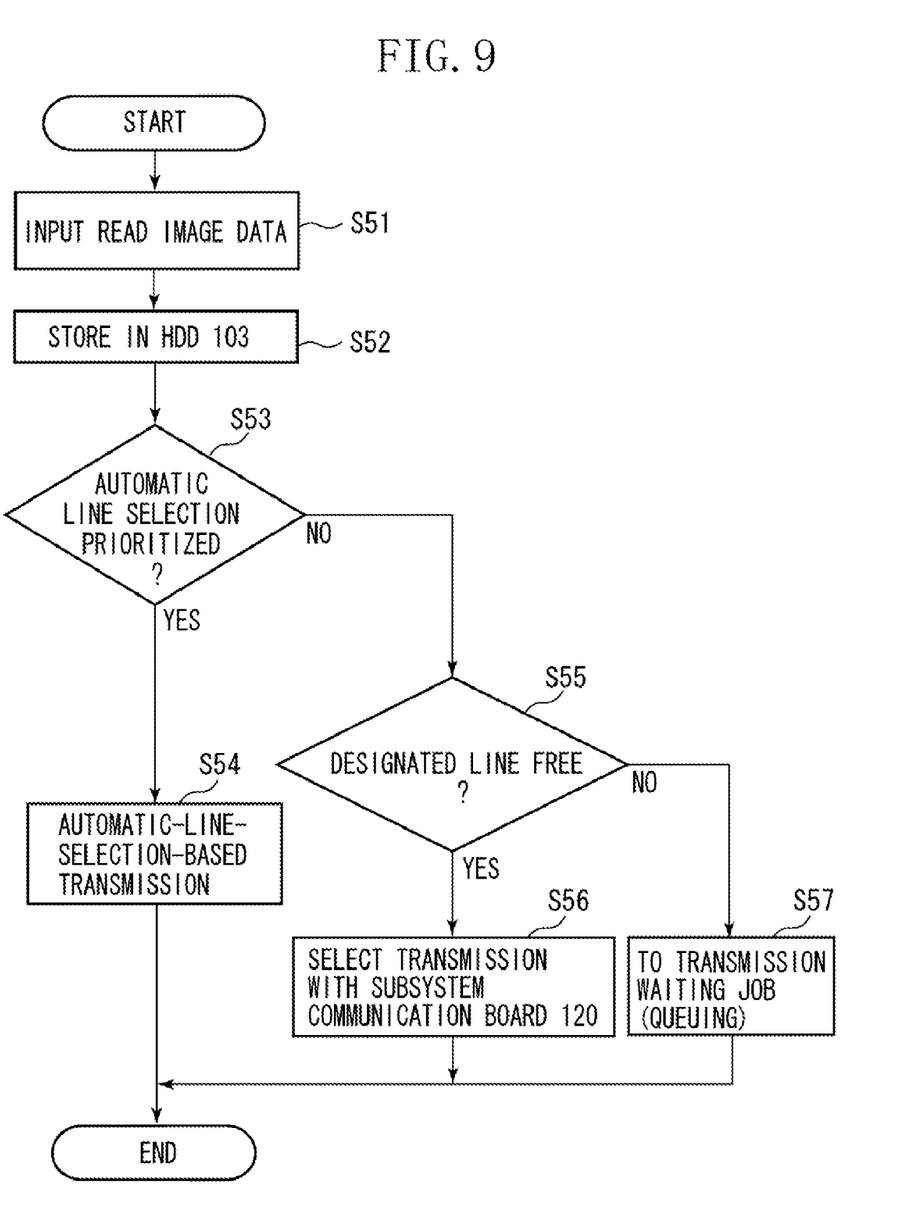
FIG. 9 is a flowchart illustrating facsimile transmission processing of a multifunction peripheral according to the second exemplary embodiment.

FIG. 9 is a flowchart illustrating facsimile transmission processing of the multifunction peripheral of the second exemplary embodiment. Programs for executing this processing are stored in the memory 102 during execution and executed under the control of the controller 101.

The processing in steps S51 and S52 is similar to that in steps S1 and S2 illustrated in FIG. 2 and thus is not described herein. In step S53, the controller 101 determines whether the "prioritize automatic line selection" 802 is selected via user setting on the screen illustrated in FIG. 8. If the "prioritize automatic line selection" 802 is selected (YES in step S53), the process advances to step S54 and the controller 101 executes processing in steps S3 to S12 illustrated in FIG. 2.

On the other hand, in step S53, if the "prioritize automatic line selection" 802 is not selected (NO in step S53), the controller 101 advances to step S55 and determines whether a designated line is free. In step S55, if the designated line is free and available (YES in step S55), the process advances to step S56 and the controller 101 executes the facsimile transmission using the designated line. On the other hand, if the designated line is not free (NO in step S55), the process advances to step S57 and the controller 101 queues the job to transmission waiting jobs.

As described above, according to the present exemplary embodiment, a user can select the mode for preferentially using the designated line or the mode for automatically switching to the line available for communications. Hence, the facsimile transmission can be performed via a desired line to improve the usability of the apparatus.

Third Exemplary Embodiment

According to a third exemplary embodiment of the present invention, at the time of attaching a communication board, a line to be used by the communication board is selected as a default.

In the multifunction peripheral of the present exemplary embodiment, the line 1 is connected to the on-board communication board 110, and the lines 2 to 4 are connected to the subsystem communication board 120. This layout is to minimize the total cost of the multifunction peripheral. For example, only a low-cost on-board communication board 110 is attached for users who require only one line to save a cost.

In contrast, the subsystem communication board 120 is attached in addition to the on-board communication board 110 for users who require two or more lines. The subsystem communication board 120 can be added before shipment as well as added as an option in the field.

As described above, in a case of using a plurality of lines, communication boards are prepared in addition to the on-board communication board 110. As a result, even if an available line increases from one to the plurality of lines, the top-priority line is set as the line 1 (default line). This setting is made in consideration of using the line 1 alone.

In a case where lines are added in midstream as described above, and if the top-priority line is always set as the line 1, the on-board communication board 110 is used frequently, and the load of the controller 101 becomes high. Thus, increase of the load on the multifunction peripheral may adversely affect the contending operation or the like.

Therefore, in the present exemplary embodiment, if only a board connected to one line (the on-board communication board 110) is attached in general, the top-priority line is set as the line 1. Then, if a communication board corresponding to the line 2 and subsequent lines (subsystem communication board 120) is added, the top-priority (default) line is automatically set to the line of the subsystem communication board 120 (for example, line 2).

Thus, in a case of adding the subsystem communication board 120, the line (line 2) of the subsystem communication board 120 that can reduce the load of the controller 101 is automatically prioritized. As a result, even if a line used most frequently is selected, the load of the controller 101 is kept low to thereby ensure stable communication processing. Further, since the load of the controller 101 can be reduced, even if other functions are concurrently performed due to the contending operation etc., these functions can be stably realized.

If it can be confirmed whether a communication board is electrically connected using a port, etc., the determination (detection) unit configured to detect the communication board can determine that the communication board is attached/detached by detecting the port using software.

As described above, according to the present exemplary embodiment, the line is automatically selected according to the load condition of the controller 101 to thereby enable optimum load distribution. Further, the communication function as well as the other functions can be stably performed with the optimum load.

Moreover, according to the second exemplary embodiment, transmission via an unexpected line can be prevented by prioritizing the designated line.

Further, according to the third exemplary embodiment, if the communication board corresponding to the second and subsequent lines is attached, transmission is preferentially performed via the communication board that can reduce the load of the controller 101. Accordingly, in a case where the lines are added, the line capable of distributing the load can be selected and the functions of the apparatus can be efficiently performed.

Other Exemplary Embodiment

The present invention is applicable to either a system including a plurality of devices or an apparatus that includes one device.

The present invention can be accomplished by directly or remotely supplying a software program implementing functions of the above exemplary embodiments to a system or an apparatus, and reading and executing the supplied program with a computer of the system or the apparatus.

In this case, the present invention is not limited to a program but in any other form having a program function. Accordingly, the present invention is accomplished by a program code that is installed on a computer to realize the functions of the exemplary embodiments of the present invention with the computer.

In other words, the program code that is installed in the computer to realize the functions of the exemplary embodiments of the present invention is also included in the present invention.

In this case, the computer program may be supplied in any form such as an object code, a program executable by an interpreter, or script data supplied to an operating system (OS) insofar as the computer program can realize a program function.

Various recording media can be used for supplying a program. Examples of the media include a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a read only memory (ROM), and a digital versatile disk (DVD) (a DVD-read only memory (DVD-ROM) and a DVD-recordable (DVD-R)).

In addition, the above program can be supplied by accessing a web site on the Internet from a browser of a client computer and downloading the program from the web site to a recording medium such as hard disk. In this case, a computer program of the present invention or a compressed file having an automatic installation function may be downloaded.

Further, the program can be supplied by dividing a program code that constitutes the program of the exemplary embodiments of the present invention into a plurality of files and downloading the files from different web sites. In other words, the present invention includes a WWW server that allows a plurality of users to download a program file for implementing the functions of the exemplary embodiments of the present invention on a computer as well.

Furthermore, the program of the exemplary embodiments of the present invention may be distributed to a user after being encrypted and stored in a storage medium such as a CD-ROM.

In this case, a user who satisfies a predetermined condition is permitted to download key information for decryption from a web site via the Internet so as to install the encrypted program in a computer-executable form based on the key information.

Further, the functions of the above exemplary embodiments of the present invention can be implemented with a conceivable form other than the above mentioned forms when a computer executes a read program. For example, the functions of the exemplary embodiments can be realized by executing a part of or whole actual processing by an OS running on a computer based on an instruction of the program.

Furthermore, a program read from a storage medium may be written to a memory of a function extension board that is inserted into a computer or a function extension unit connected to a computer. In this case, a CPU or the like that is provided to the function extension board or the function extension unit performs a part of or whole actual processing based on an instruction of the program to thereby realize the functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-229451 filed Sep. 4, 2007, which is hereby incorporated by reference herein in its entirety.

What is claimed is:

1. A communication apparatus, comprising:
   a control unit including a controller configured to control the communication apparatus;
   a first communication unit configured to perform facsimile communication under control of the controller;
   a second communication unit including a subcontrol unit and configured to perform facsimile communication under control of the subcontrol unit;
   a condition determination unit configured to determine whether or not a function other than facsimile communication is being performed under control of the controller; and
   a selection unit configured to select the first communication unit to perform facsimile communication when it is determined that a function other than facsimile communication is not being performed under control of the controller, and to select the second communication unit to perform facsimile communication when it is determined that a function other than facsimile communication is being performed under control of the controller.

2. The communication apparatus according to claim 1, wherein the first communication unit and the second communication unit are connected to different communication lines.

3. The communication apparatus according to claim 1, further comprising:
   an instruction unit configured to prompt a user to instruct whether to prioritize selection by the selection unit or preferentially select the first communication unit or the second communication unit corresponding to a communication line selected by the user.

4. The communication apparatus according to claim 1, wherein the second communication unit is mounted on a board which is detachable/attachable to the communication apparatus.

5. A method for controlling a communication apparatus that includes a control unit including a controller configured to control the communication apparatus, a first communication unit configured to perform facsimile communication under control of the controller, and a second communication unit including a subcontrol unit and configured to perform facsimile communication under control of the subcontrol unit, the method comprising:
   determining whether or not a function other than facsimile communication is being performed under control of the controller; and
   selecting the first communication unit to perform facsimile communication when it is determined that a function other than facsimile communication is not being performed under control of the controller and to select the second communication unit to perform facsimile communication when it is determined that a function other than facsimile communication is being performed under control of the controller.

6. The method according to claim 5, wherein the first communication unit and the second communication unit are connected to different communication lines.

7. The method according to claim 5, further comprising:
   prompting a user to instruct whether to prioritize selection of the first communication unit or the second communication unit based on the determined load condition or preferentially select the first communication unit or the second communication unit corresponding to a communication line selected by the user.

8. The method according to claim 5, wherein the second communication unit is mounted on a board which is detachable/attachable to the communication apparatus.

9. The communication apparatus according to claim 1, further comprising a reading unit configured to read an original and generate image data to be transmitted by facsimile communication,
   wherein the selection by the selection unit is performed after the reading unit reads the original.

10. The method according to claim 5, further comprising:
    reading an original and generate image data to be transmitted by facsimile communication,
    wherein the selection is performed after the original is read.

11. A non-transitory computer readable storage medium storing a program for causing a computer to execute the method defined by claim 5.

12. The non-transitory computer readable storage medium according to claim 11, wherein the first communication unit and the second communication unit are connected to different communication lines.

13. The non-transitory computer readable storage medium according to claim 11, wherein the method further comprises prompting a user to instruct whether to prioritize selection of the first communication unit or the second communication unit based on the determined load condition or preferentially select the first communication unit or the second communication unit corresponding to a communication line selected by the user.

14. The non-transitory computer readable storage medium according to claim 11, wherein the second communication unit is mounted on a board which is detachable/attachable to the communication apparatus.

15. The non-transitory computer readable storage medium according to claim 11, wherein the method further comprises:
    reading an original and generate image data to be transmitted by facsimile communication,
    wherein the selection is performed after the original is read.

* * * * *